United States Patent
Krishan

(10) Patent No.: US 12,192,768 B2
(45) Date of Patent: Jan. 7, 2025

(54) METHODS, SYSTEMS, AND COMPUTER READABLE MEDIA FOR HANDLING HACKER INTRUSION IN PROFILE MANAGEMENT AT NETWORK FUNCTION (NF) REPOSITORY FUNCTION (NRF)

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 321 days.

(21) Appl. No.: 17/583,177

(22) Filed: Jan. 24, 2022

(65) Prior Publication Data
US 2023/0239697 A1    Jul. 27, 2023

(51) Int. Cl.
| H04W 12/122 | (2021.01) |
| G06F 8/71 | (2018.01) |
| H04L 41/0806 | (2022.01) |
| H04L 41/28 | (2022.01) |
| H04L 43/10 | (2022.01) |

(52) U.S. Cl.
CPC ............ *H04W 12/122* (2021.01); *G06F 8/71* (2013.01); *H04L 41/0806* (2013.01); *H04L 41/28* (2013.01); *H04L 43/10* (2013.01)

(58) Field of Classification Search
CPC .... H04W 12/122; G06F 8/71; H04L 41/0806; H04L 41/28; H04L 43/10
See application file for complete search history.

(56) References Cited

U.S. PATENT DOCUMENTS

| 6,725,278 B1 | 4/2004 | Gonzalez |
| 7,151,945 B2 | 12/2006 | Myles et al. |
| 7,706,822 B2 | 4/2010 | Emeott et al. |
| 8,306,034 B2 | 11/2012 | Jang et al. |

(Continued)

FOREIGN PATENT DOCUMENTS

WO    WO 2022/083867 A1    4/2022

OTHER PUBLICATIONS

Issue Notification for U.S. Appl. No. 17/460,149 (Jan. 5, 2023).

(Continued)

*Primary Examiner* — Sm A Rahman
(74) *Attorney, Agent, or Firm* — Jenkins, Taylor & Hunt, P.A.

(57) ABSTRACT

A method for handling hacker intrusion in NF profile management at an NRF includes receiving, at the NRF and from a consumer NF, an NF register request message including an NF profile of the consumer NF, setting and storing an NF profile version number for the NF profile, and communicating the NF profile version number to the consumer NF. The consumer NF stores the NF profile version number and transmits a request for initiating an NF update or NF heart-beat service operation to the NRF. The NRF receives the request for initiating the NF update or NF heart-beat service operation, increments the NF profile version number, and communicates the incremented NF profile version number to the consumer NF. The consumer NF receives the incremented NF profile version number, determines that an NF profile version mismatch has occurred, and, in response, initiates an NF profile corrective action with the NRF.

20 Claims, 9 Drawing Sheets

(56) References Cited

U.S. PATENT DOCUMENTS

| | | | |
|---|---|---|---|
| 8,620,858 | B2 | 12/2013 | Backholm et al. |
| 8,767,705 | B2 | 7/2014 | Göppner et al. |
| 8,811,372 | B2 | 8/2014 | Li et al. |
| 8,824,449 | B2 | 9/2014 | van der Wateren et al. |
| 9,386,551 | B2 | 7/2016 | Zhou et al. |
| 9,832,719 | B2 | 11/2017 | Horn et al. |
| 10,833,938 | B1* | 11/2020 | Rajput ................ H04L 67/1095 |
| 11,563,638 | B1 | 1/2023 | Jayaramachar et al. |
| 2004/0062278 | A1 | 4/2004 | Hadzic et al. |
| 2008/0165761 | A1 | 7/2008 | Goppner et al. |
| 2009/0006652 | A1 | 1/2009 | Kasatani |
| 2009/0024727 | A1 | 1/2009 | Jeon et al. |
| 2014/0075004 | A1 | 3/2014 | Van Dusen et al. |
| 2017/0109719 | A1 | 4/2017 | Amtrup et al. |
| 2019/0068748 | A1 | 2/2019 | Abdel-Maguid et al. |
| 2019/0141095 | A1* | 5/2019 | John ..................... H04L 67/145 |
| 2020/0409687 | A1* | 12/2020 | Rouland ............... H04L 9/3236 |
| 2021/0250411 | A1* | 8/2021 | Cakulev ................. H04L 67/52 |

OTHER PUBLICATIONS

Corrected Notice of Allowability for U.S. Appl. No. 17/460,149 (Oct. 6, 2022).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Services and System Aspects; Security architecture and procedures for 5G system (Release 17)," 3GPP TS 33.501 V17.3.0 pp. 1-258 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

Hardt et al., "The OAuth 2.0 Authorization Framework," Internet Engineering Task Force (IETF), Request for Comments 6749, pp. 1-76 (Oct. 2012).

Notice of Allowance and Fee(s) Due for U.S. Appl. No. 17/460,149 (Sep. 23, 2022).

Non-Final Office Action for U.S. Appl. No. 17/460,149 (May 26, 2022).

Notice of Allowance and Fee(s) Due for U.S. Appl. No. 16/527,988 (Sep. 17, 2020).

"Checksum," Wikipedia, pp. 1-4 (Jul. 18, 2021).

"3rd Generation Partnership Project; Technical Specification Group Core Network and Terminals; 5G System; Network Function Repository Services; Stage 3 (Release 17)," 3GPP TS 29.510, V17.2.0, pp. 1-256 (Jun. 2021).

3rd Generation Partnership Project; Technical Specification Group Services and System Aspects; Procedures for the 5G System (5GS); Stage 2 (Release 17), 3GPP TS 23.502, V17.1.0, pp. 1-692 (Jun. 2021).

3rd Generation Partnership Project; Technical Specification Group Services and System Aspects; System architecture for the 5G System (5GS); Stage 2 (Release 17), 3GPP TS 23.501, V17.1.1, pp. 1-526 (Jun. 2021).

Ex Parte Quayle Action for U.S. Appl. No. 16/527,988 (Jun. 1, 2020).

Commonly-assigned, co-pending U.S. Appl. No. 17/460,149 for "Methods, Systems, and Computer Readable Media for Optimizing Network Bandwidth Utilization Through Intelligent Updating," (filed Aug. 27, 2021).

Commonly-assigned, co-pending U.S. Appl. No. 16/527,988 for "Methods, Systems, and Computer Readable Media for Network Function (NF) Topology Synchronization," (filed Jul. 31, 2019).

* cited by examiner

METHODS, SYSTEMS, AND COMPUTER READABLE MEDIA FOR HANDLING HACKER INTRUSION IN PROFILE MANAGEMENT AT NETWORK FUNCTION (NF) REPOSITORY FUNCTION (NRF)

TECHNICAL FIELD

The subject matter described herein relates to network security. More particularly, the subject matter described herein relates to methods, systems, and computer readable media for handling hacker intrusion in profile management at the NRF.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains service profiles of available NF instances identifying the services supported by each NF instance. The service profile of an NF instance is referred to in 3GPP TS 29.510 as an NF profile. NF instances can obtain information about other NF instances that have registered with the NRF through the NF service discovery procedure. According to the NF service discovery procedure, a consumer NF sends an NF discovery request to the NRF. The NF discovery request includes query parameters that the NRF uses to locate service profiles of producer NFs or SCPs capable of providing the service identified by the query parameters. Service profiles are data structures that define the type of service provided by an NF instance and well as contact and capacity information regarding the NF instance. Thus, it is very important to maintain the integrity of NF or service profiles maintained by the NRF.

A service communication proxy (SCP) can also invoke the NF service discovery procedure to learn about available producer NF instances. The case where the SCP uses the NF service discovery procedure to obtain information about producer NF instances on behalf of consumer NFs is referred to as delegated discovery. Consumer NFs connect to the service communication proxy, and the service communication proxy load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other communications networks is that a hacker can modify the NF profile of an NF instance maintained by the NRF, and such modification can lead to service disruption in the network. For example, the NRF is a repository of NF profiles which contain all of the parameters of NF instances used to define the services provided by the producer NFs. An NF can modify its own NF profile using the NF update or NF heart-beat service operation. However, a hacker impersonating an NF can also modify the NF profile of the NF with the NRF using the NF update or NF heart-beat service operation. Such unauthorized access could be used, for example, to modify parameters, such as capacity, to direct traffic away from a producer NF.

To protect against unauthorized modification of the NF profile, 3GPP standards for direct communication indicate that the NRF and the NF should authenticate each other during discovery, registration, and access token request service operations. For indirect communications, 3GPP standards specify that the NF and the NRF shall use either transport layer authentication, network domain security (NDS)/Internet protocol (NDS/IP) security, or physical security. If indirect communication is used, mutual authentication between the NRF and the NF can be provided by transport layer security or client credentials assertion (CCA). If these authentication mechanisms fail, a hacker can modify the NF profile of an NF with the NRF and disrupt service in the network.

Accordingly, in light of these and other difficulties, there exists a need for improved methods, systems, and computer readable media for handling hacker intrusion in profile management at the NRF.

SUMMARY

A method for handling hacker intrusion in network function (NF) profile management at an NF repository function (NRF) includes receiving, at the NRF and from a consumer NF, an NF register request message including an NF profile of the consumer NF. The method further includes setting, by the NRF, an NF profile version number for the NF profile. The method further includes storing, by the NRF, the NF profile and the NF profile version number. The method further includes communicating, by the NRF, the NF profile version number to the consumer NF. The method further includes, at the consumer NF, storing the NF profile version number received from the NRF. The method further includes, at the consumer NF, transmitting a first request for initiating an NF update or NF heart-beat service operation to update the NF profile with the NRF. The method further includes, at the NRF, receiving the first request for initiating the NF update or NF heart-beat service operation, incrementing the NF profile version number, and communicating the incremented NF profile version number to the consumer NF. The method further includes, at the consumer NF, receiving the incremented NF profile version number, determining whether an NF profile version mismatch has occurred, and, in response to determining that an NF profile version mismatch has occurred, initiating an NF profile corrective action with the NRF.

According to another aspect of the subject matter described herein, setting, by the NRF, the NF profile version number includes algorithmically generating the NF profile version number at the NRF.

According to another aspect of the subject matter described herein, algorithmically generating the NF profile version number at the NRF includes using a random number generation algorithm to generate the NF profile version number at the NRF.

According to another aspect of the subject matter described herein, communicating the NF profile version number to the consumer NF includes communicating the NF profile version number in a response to the NF register request message.

According to another aspect of the subject matter described herein, communicating the incremented NF profile version number to the consumer NF includes communicating the incremented NF profile version number to the consumer NF in a response message to the first request for initiating the NF heart-beat or NF update service operation.

According to another aspect of the subject matter described herein, communicating the incremented NF profile version number to the consumer NF includes communicating the incremented NF profile version number to the consumer NF in a custom header added to the response message, and, the method for handling hacker intrusion in NF profile management at the NRF further includes communicating, via the response message, a profile version updated indicator to the consumer NF indicating that the NF profile version number has been changed by the NRF.

According to another aspect of the subject matter described herein, determining whether an NF profile version mismatch has occurred includes, at the consumer NF, comparing the incremented NF profile version number received from the NRF with the stored NF profile version number or an incremented version of the stored NF profile version number.

According to another aspect of the subject matter described herein, determining whether an NF profile version mismatch has occurred includes determining that an NF profile version mismatch has occurred and initiating the NF profile corrective action with the NRF includes transmitting, from the consumer NF and to the NRF, a second request for initiating an NF update service operation for replacing the NF profile for the consumer NF maintained by the NRF with a locally stored version of the NF profile maintained by the consumer NF.

According to another aspect of the subject matter described herein, determining whether an NF profile version mismatch has occurred includes determining that an NF profile version mismatch has not occurred, and, in response, at the consumer NF, incrementing the stored NF profile version number.

According to another aspect of the subject matter described herein, the method for handling hacker intrusion in NF profile management at the NRF includes maintaining, at the NRF, a list of exception parameters for which the NF profile version number is not updated, receiving, at the NRF, a second request for initiating an NF update or NF heart-beat service operation, determining that the second request updates only NF profile parameters on the list of exception parameters, and, in response, refraining from incrementing the NF profile version number.

According to another aspect of the subject matter described herein, a system for handling hacker intrusion in network function (NF) profile management at an NF repository function (NRF), includes an NRF including at least one processor. The system further includes a consumer NF including at least one processor. The system further includes an NF profile version number generator/communicator implemented by the at least one processor of the NRF for receiving, at the NRF and from the consumer NF, an NF register request message including an NF profile of the consumer NF, setting an NF profile version number for the NF profile, storing the NF profile and the NF profile version number, and communicating the NF profile version number to the consumer NF. The system further includes an NF profile manager implemented by the at least one processor of the consumer NF for storing the NF profile version number received from the NRF and transmitting a first request for initiating an NF update or NF heart-beat service operation to update the NF profile with the NRF. The NF profile version number generator/communicator is configured to receive the first request for initiating the NF update or NF heart-beat service operation, increment the NF profile version number, and communicate the incremented NF profile version number to the consumer NF and the NF profile manager is configured to receive the incremented NF profile version number, determine whether an NF profile version mismatch has occurred, and, in response to determining that an NF profile version mismatch has occurred, initiate an NF profile corrective action with the NRF.

According to another aspect of the subject matter described herein, the NF profile version number generator/communicator is configured to algorithmically generate the NF profile version number at the NRF.

According to another aspect of the subject matter described herein, the NF profile version number generator/communicator is configured to use a random number generation algorithm to generate the NF profile version number at the NRF.

According to another aspect of the subject matter described herein, the NF profile version number generator/communicator is configured to communicate the NF profile version number to the consumer NF in a response to the first NF register request message.

According to another aspect of the subject matter described herein, the NF profile version number generator/communicator is configured to communicate the incremented NF profile version number to the consumer NF in a response message to the first request for initiating the NF update or NF heart-beat service operation.

According to another aspect of the subject matter described herein, the NF profile manager is configured to determine whether an NF profile version mismatch has occurred by comparing the incremented NF profile version number received from the NRF with the stored NF profile version number or an incremented version of the stored NF profile version number.

According to another aspect of the subject matter described herein, the NF profile manager is configured to determine that an NF profile version mismatch has occurred and initiate the NF profile corrective action with the NRF by transmitting, from the consumer NF and to the NRF, a second request for an NF update service operation for replacing the NF profile for the consumer NF maintained by the NRF with a locally stored version of the NF profile maintained by the consumer NF.

According to another aspect of the subject matter described herein, the NF profile manager is configured to determine that an NF profile version mismatch has not occurred, and, in response, at the consumer NF, incrementing the stored NF profile version number.

According to another aspect of the subject matter described herein, the NF profile version number generator/communicator is configured to maintain, at the NRF, a list of exception parameters for which the NF profile version number is not updated, receive, a second request for initiating an NF update or NF heart-beat service operation, determine that the second request updates only NF profile parameters on the list of exception parameters, and, in response, refrain from incrementing the NF profile version number.

According to another aspect of the subject matter described herein, one or more non-transitory computer readable media having stored thereon executable instructions that when executed by one or more processors of one or more computers control the one or more computers to perform steps are provided. The steps include receiving, at a network function (NF) repository function (NRF) and from a consumer NF, an NF register request message including an NF profile of the consumer NF. The steps further include setting, by the NRF, an NF profile version number for the NF profile. The steps further include storing, by the NRF, the NF profile and the NF profile version number. The steps further include communicating, by the NRF, the NF profile version number to the consumer NF. The steps further include, at the consumer NF, storing the NF profile version number received from the NRF. The steps further include, at the consumer NF, transmitting a first request for initiating an NF update or NF heart-beat service operation to update the NF profile with the NRF. The steps further include, at the NRF, receiving the first request for initiating the NF update or NF heart-beat service operation, incrementing the NF profile version number, and communicating the incremented NF profile version number to the consumer NF. The steps further include, at the consumer NF, receiving the incremented NF profile version number, determining whether an NF profile version mismatch has occurred, and, in response to determining that an NF profile version mismatch has occurred, initiating an NF profile corrective action with the NRF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
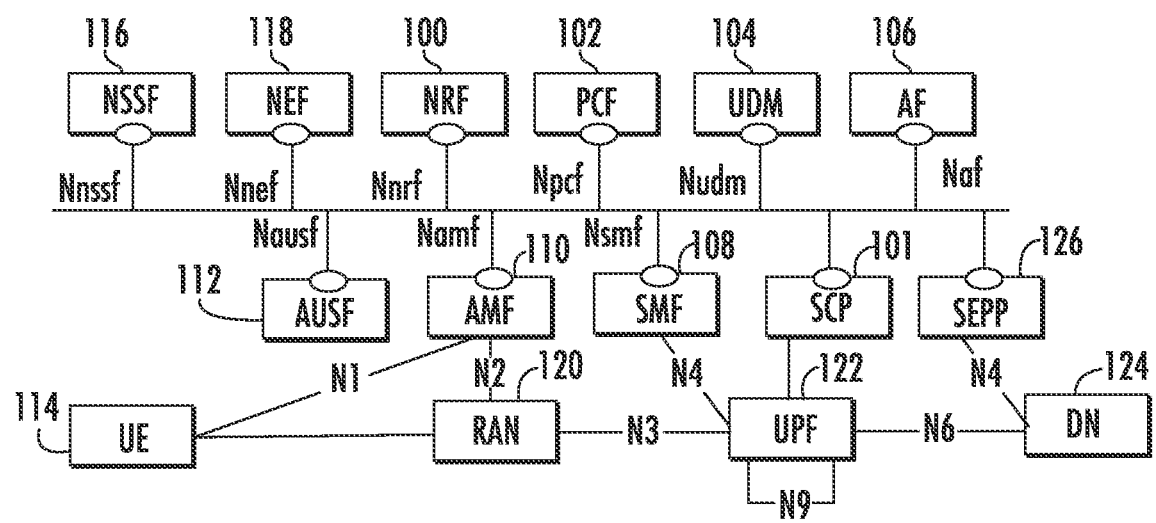
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for service profiles of NF instances and SCP profiles of SCP instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance. The SCP profile is a service profile with parameters specific to an SCP instance. The term "service profile" is intended to refer to an NF profile or an SCP profile. Similarly, since an SCP is a specific type of NF instance, the term "NF instance" refers to SCP instances as well as any of the other NF instance types described herein.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G and other networks is that a hacker can gain unauthorized access to the NF profile of a producer NF maintained by the NRF, modify the profile, and thereby disrupt service in the network. 3GPP TS 29.510 describes the functionality of the NRF. According to 3GPP TS 29.510, the NRF provides the interface for NFs to register or update their profiles at runtime. 3GPP TS 29.510 also defines the NF discovery procedure through which consumer NFs, SCPs, and SEPPs can discover the NF profiles of producer NFs. Using the discovered information, the consumer NFs, SCPs, and SEPPs can select a producer NF instance to provide a service and route request messages to the selected producer NF instance.

3GPP TS 29.510 also defines security for NRF management service operations. For example, Section 6.1.8 indicates that access to the Nnrf_NFManagement application programming interface (API) may be authorized by means of the OAuth2 protocol (see IETF RFC 6749), using the "Client Credentials" authorization grant, where the NRF plays the role of the authorization server.

3GPP TS 33.501 defines security procedures for 5G networks. Security procedures are specified for direct communication (communication between an NF service consumer and an NF service producer without an intermediate SCP) and indirect communication (communication between an NF service consumer and an NF service producer via an intermediate SCP). Section 13.3.1.1 of 3GPP TS 33.501 specifies that for direct communication, the NRF and NF shall authenticate each other during discovery, registration, and access token request service operations. For direct communication, 3GPP TS 33.501 indicates that the NF and NRF shall use one of the following methods for authentication:

If the PLMN uses protection at the transport layer as described in clause 13.1, authentication provided by the transport layer protection solution shall be used for mutual authentication of the NRF and NF.

If the PLMN does not use protection at the transport layer, mutual authentication of the NRF and NF may be implicit by NDS/IP or physical security (see clause 13.1).

Section 13.3.1.2 of 3GPP TS 33.501 specifies security mechanisms for indirect communication. For indirect communication, the NF and NRF shall use one of the following methods for authentication:

Mutual authentication between the NF and NRF provided by the transport layer protection solution.

Client credentials assertion (CCA)-based authentication as specified in clause 13.3.8.

If a hacker successfully impersonates a producer NF with the NRF, NF profile modification and service disruption can occur. The NRF reads NF instance information available in the service request and performs the requested operation on the NF profile. For communication models B, C, and D (as defined by 3GPP), consumers (NFs/SCPs/SEPPs) discover other NF profiles from the NRF and, based on locality, capacity, priority and load, select a producer for service requests (or notifications). Therefore, the NF profile is key information in the NRF that helps shape and structure flows of 5G message in an operator's network. The NF profile is the most important and critical information in the network. Profile integrity and consistency between the producer NF and NRF has to be ensured to achieve expected routing behavior.

If a hacker can access NRF flows, the hacker can fail/impact the overall 5G network, without hacking or disrupting signaling flows between NFs. For example, the hacker can manipulate existing parameters of one or more profiles to disrupt signaling flows. Unless the NF service producer performs a periodic check of its profile data at NRF, there is no existing 3GPP-defined procedure for the producer NF to detect that a hacker has modified its profile at the NRF. Other ways that a hacker can disrupt service include deleting existing profiles from the NRF and creating new profiles with black-hole information (e.g., fake FQDNs, priority, versions, capacity, etc.)

Figure 2:
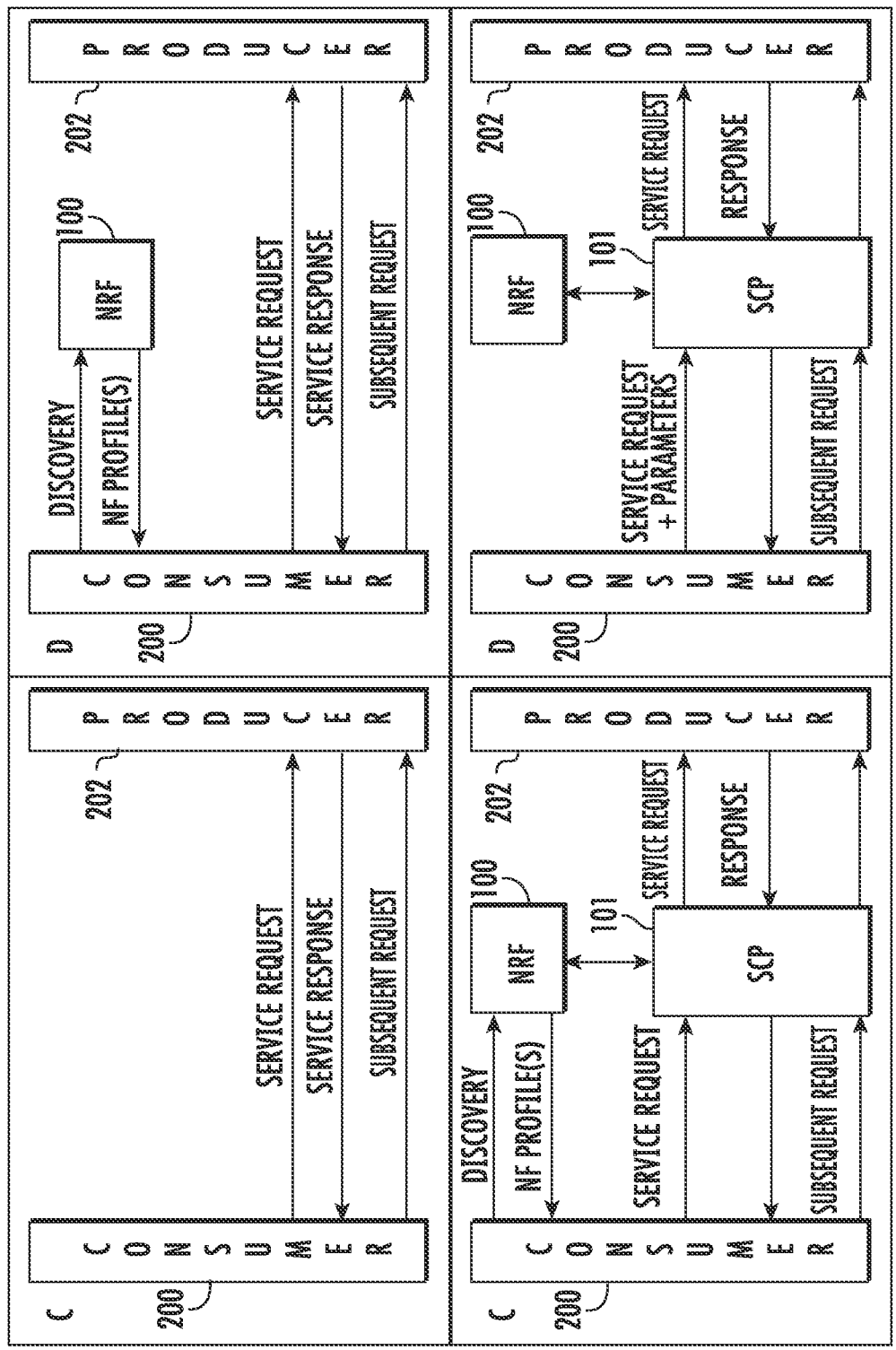
FIG. 2 is a network diagram illustrating 3GPP-defined communication models for 5G networks.

FIG. 2 is a network diagram illustrating 3GPP-defined communication models. The upper left-hand quadrant in FIG. 2 illustrates communication model A where a consumer NF 200 communicates directly with a producer NF 202 without using the NRF to discover NF profile parameters of producer NF 202. In this example, consumer NF 200 is configured with the NF profile parameters of producer NF 202. As a result, hacker intrusion at the NRF will not disrupt service in the network for communication model A.

The upper right hand quadrant in FIG. 2 illustrates 3GPP-defined communication model B. Communication model B is referred to as direct communication with NF discovery, because consumer NF 200 communicates directly with producer NF 202 using discovered NF profile information from NRF 100. If a hacker manipulates the NF profile maintained by NRF 100, service in a network that uses 3GPP-defined communication model B can be disrupted.

The lower left-hand quadrant in FIG. 2 illustrates 3GPP-defined communication model C. 3GPP-defined communication model C is referred to as indirect communication without delegated discovery, because consumer NF 200 communicates indirectly with producer NF 202 via SCP 101. Consumer NF 200 performs its own discovery with NRF 100 to determine the NF profile parameters of producer NF 202. If a hacker modifies the NF profile of producer NF 202 maintained at NRF 100, service in a network that uses 3GPP-defined communication model C can be disrupted.

The lower right hand quadrant in FIG. 2 illustrates 3GPP-defined communication model D, which is also referred to as indirect communication with delegated discovery. In indirect communication with delegated discovery, consumer NF 200 communicates indirectly with producer NF 202 via SCP 101. Consumer NF 200 also delegates NF discovery service operations to SCP 101. SCP 101 performs discovery on behalf of consumer NF 200 using parameters provided by consumer NF 200 in service request messages. Because 3GPP-defined communication model D relies on NF profile information maintained by NRF 100, hacker intrusion at NRF 100 can disrupt service in a network that uses 3GPP-defined communication model D.

Figure 3:
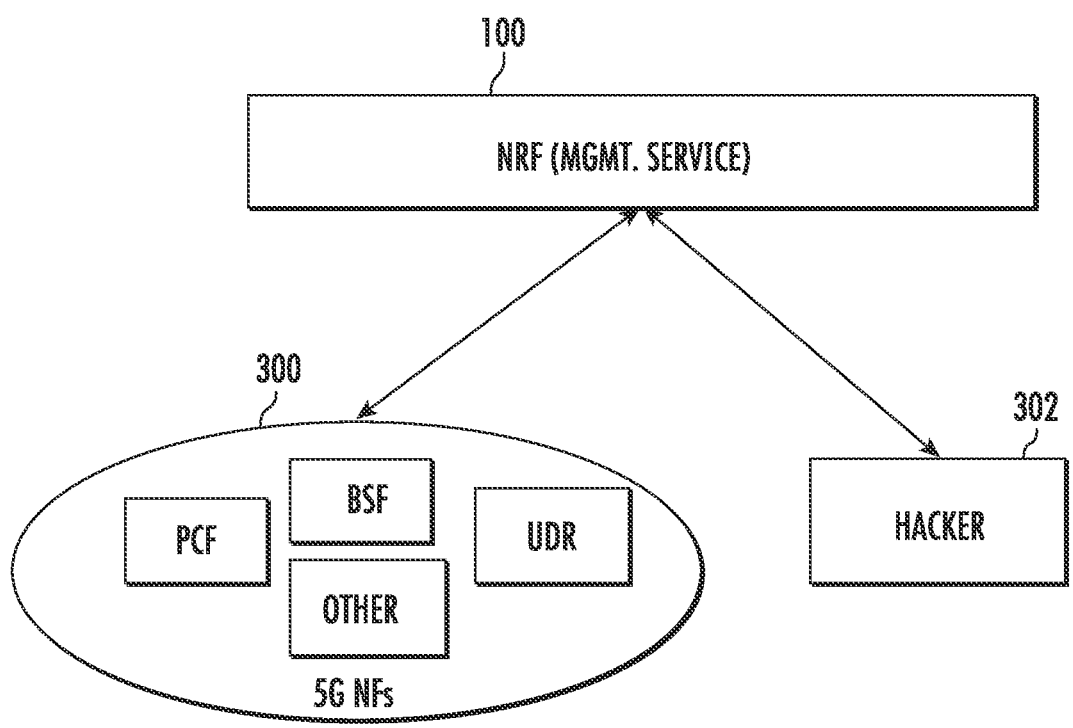
FIG. 3 is a network diagram illustrating a hacker manipulating NF profiles using NRF management service operations.

FIG. 3 illustrates 5G NFs 300 which register their profiles with NRF 100 and discover registered profiles of other NFs with NRF 100. A hacker 302 can disrupt service in the network by gaining unauthorized access to the profiles stored by NRF 100 and modifying or deleting the profiles. The subject matter described herein includes a check mechanism between the NRF and the producer NF to reduce the likelihood of successful unauthorized modification of NF profiles.

Industry relies on strong transport security to avoid unauthorized access into NF flows. However, a breach in security can occur for any number of reasons, e.g., due to the deployment architecture of the NRF or the NF, $3^{rd}$ party vulnerability, e.g., transport layer security (TLS) gaps, software bugs, unsecured transport or connection, unsecured services within the NF, etc. There are no guidelines or recommendations from 3GPP to solve this problem. Thus, any implementation between the NF and NRF is proprietary in nature.

One such proprietary model for NF profile security could be for the NF to periodically pull its own NF profile from the NRF and validate the data (against its configuration). However, this not only generates additional traffic between the NF and NRF, but also requires additional logic at the NF to compare profile parameters. Such a model wastes network and compute resources at the NRF and the NF.

Another such model could be where the NF adds a digital signature of its profile along with a registration or update or patch request towards the NRF. However, this model has serious drawbacks because the NRF is required to be statically configured with each NF's public key for signature validation. Sending a dynamic key (as done in CCA, etc.) along with a registration/update/patch request does not solve the problem, as a hacker can use its own private keys to generate a digital signature and send a signed digital signature along with its public key for validation.

For handling fake profiles created by a hacker, an operator can configure a maximum profile count per NF type. Thus, if a hacker tries to register a new profile of an NF type for which a maximum number is configured, and the registration would cause the maximum number to be exceeded, the registration will fail, and the NRF will respond with a 500 Internal Server Error. According to 3GPP TS 29.500, if the registration of the NF instance fails at the NRF due to NRF internal errors, the NRF shall return a "500 Internal Server Error" status code with the Problem Details information element (IE) providing details of the error. The NRF can also raise an alert/alarm for an operator to monitor any potential hacking in its network.

For handling the delete profile case, a valid NF instance will continue to trigger heart-beats with the NRF. As per 3GPP TS 29.510, Sections 5.2.2.3.1 and 5.2.2.3.2, if the NF Instance, identified by the NF instance ID, is not found in the list of registered NF Instances in the NRF's database, the NRF shall return a 404 Not Found status code with the ProblemDetails IE providing details of the error. In this case, the NF can try to re-register and/or raise an alert/alarm for the operator to monitor any potential hacking in its network.

For handling modification, special care is required, because the change can go unnoticed between the NF and NRF and thus can lead to serious damage to the 5G network. The subject matter described herein is directed to a solution for detecting and remedying unauthorized NF profile modification.

To protect against unauthorized NF profile modification, the NRF maintains a profile version number for every registration/modification request received and accepted for a given NF instance ID, i.e., for any operation as described in 3GPP TS 29.510, Section 5.2.2.2 (NF Register) and Section 5.2.2.3 (NF update) (including NF heart-beat and NF update). The NRF increments the profile version number any time an NF update or heart-beat operation changes NF profile parameters. The following is an example of the profile version that is maintained by the NRF for an instance ID: instanceId: <current version>When the NRF registers an NF profile of an NF instance, the NRF may generate, assign, and store a version number for the profile. In one example, the NRF may algorithmically generate the profile version number using a number generation algorithm, such as a random number generation algorithm. The NRF may increment the profile version any time a successful NF update or NF heartbeat changes one or more parameters of the NF profile. In one option, the network operator may configure an exception set of parameters at the NRF, which when changed does not require an NF profile version number update at the NRF. For example, the operator may configure the NRF not to update an NF profile version number if either of the load or the load timestamp parameters are updated.

In response to NF register/heart-beat/update requests, the NRF sends the following data to the NF consumer or SCP in custom headers:

"profile_version_updated": [Yes/No]

"No" is sent only if all parameters in the PATCH request from the NF matches with the exception set of parameters "profile_version": <current version number>The consumer NF locally stores a copy of the version number received from the NRF in response to a registration request and implements the following logic to update the stored version number when a response to an NF update or NF heart-beat request is received:

If "profile_version_updated" is yes, then increment last stored version number in local memory/database (i.e., "local_profile_version").

The consumer NF compares the incremented last stored version number to the version number received in the response message. If the incremented last stored version number does not match the received NF profile version number in the response to the NF update or NF heart-beat request, the consumer NF detects a profile version mismatch and re-applies complete profile with correct data as follows:

On every heart-beat or update response, if "local_profile_version+1" !="profile_version in response", then the NF detects a breach of its profile data at the NRF. The NF immediately uses the NF update service operation (as described in Section 5.2.2.3.1 of 3GPP TS 29.510) to publish the complete NF profile to override existing NF profile in NRF. The NF can also raise an alert/alarm to notify the operator of an anomaly in the operator's network.

The solution described herein works for 3GPP TS 29.510 Section 5.2.2.2.2 NF (other than the NRF) registration to the NRF as well as Section 5.2.2.2.3 NRF registration to another NRF model. Thus, the solution works with any client or consumer (NF/NRF/SCP) and server (NRF) pair that understand the version information discussed above. The solution allows the NF to verify that its profile data at the NRF is aligned to its local profile data, without performing any custom procedure to fetch profile from the NRF and run parameter by parameter comparison.

The solution complements existing security considerations at the NRF or NF. The solution integrates with existing NRF procedures to re-publish the profile when a breach is detected. No new message procedure introduced for solution.

The solution is fully backward compatible with 3GPP-defined procedures. If the NRF is not capable of version tracking, then clients cannot detect breaches in their profile data at the NRF. This will leave the NF to operate as per the behavior defined by 3GPP. If the NF is not capable of tracking and reacting to version information, then the NF will ignore version information published by NRF. In this case, clients will not be able to detect breach in their profile data, but will comply to behavior defined by 3GPP.

Figure 4:
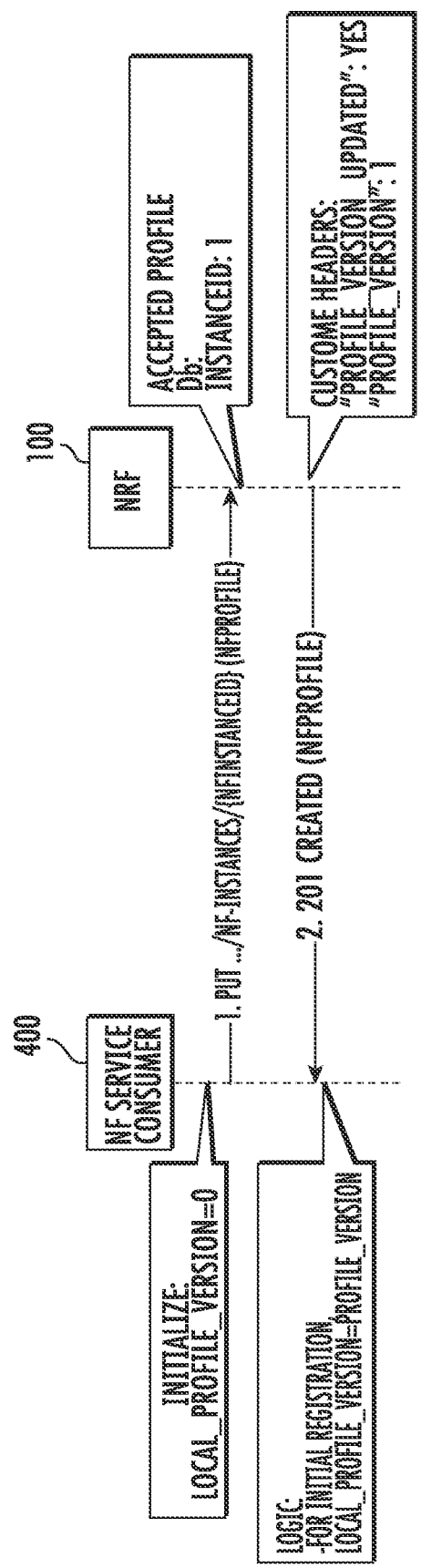
FIG. 4 is a message flow diagram illustrating exemplary messages exchanged in an NF register service operation where the NRF and the registering consumer NF each maintain an NF profile version.

FIG. 4 is a message flow diagram illustrating exemplary messages exchanged for an NF register service operation when NF version tracking is used to detect and remedy NF profile modification at the NRF. Referring to FIG. 4, a consumer NF 400 initiates the NF register service operation in line 1 by sending an NF register request implemented using an HTTP PUT message to NRF 100. The NF register message contains the NF profile of the registering NF. The registering NF is illustrated in FIG. 4 as an NF service consumer or consumer NF 400 because the registering NF is acting as a service consumer from the perspective of NRF 100. The registering NF is registering its NF profile with NRF 100 so that other NFs acting as service consumers can discover the NF profile and use the NF profile to contact the NF, which will then function as an NF service producer. NRF 100 receives the HTTP PUT message and algorithmically generates an NF profile version number for the NF instance ID in the HTTP PUT message. In the illustrated example, the NF profile version number is initialized to 1. In line 2, NRF 100 sends a response to the NF register request, which is a 201 Created message that includes the NF profile of consumer NF 400. NRF 100 includes two custom headers in the response message, the profile version updated header indicating that the profile version has been updated and the profile version header storing the value of 1. Consumer NF 400 receives the response message, determines that the response message includes an NF profile version, and stores the NF profile version number read from the response message in memory local to consumer NF 400.

Figure 5:
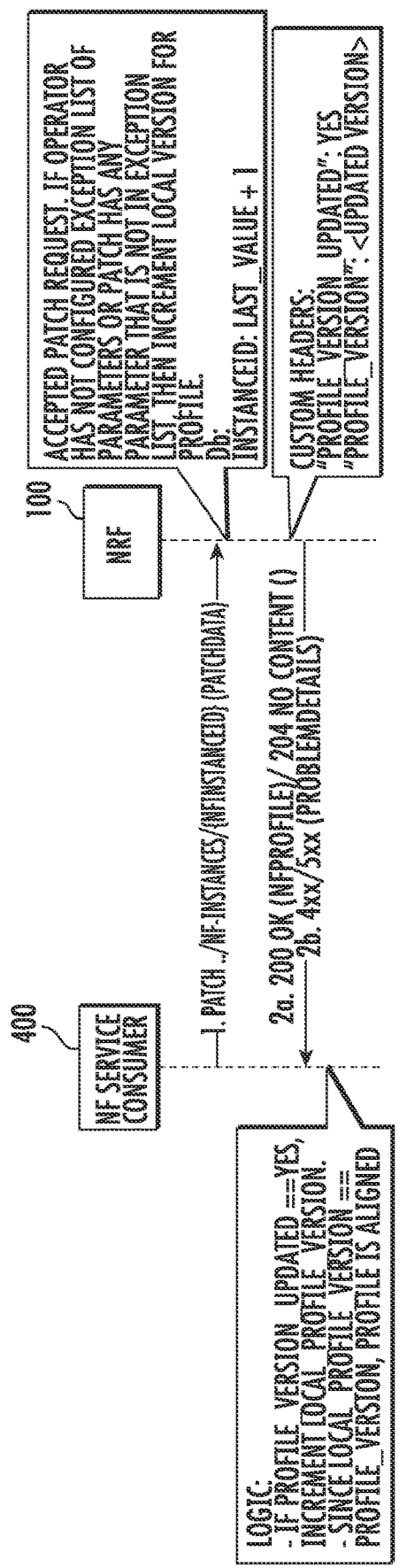
FIG. 5 is a message flow diagram illustrating exemplary messages exchanged in an NF heart-beat or NF update service operation where NF profile versions maintained by the heart-beating NF and the NRF are aligned.

FIG. 5 is a message flow diagram illustrating exemplary messages exchanged for the NF heart-beat or NF update service operation when NF profile version tracking is implemented and the NF profile version maintained by the NRF is aligned with the NF profile version maintained by the consumer NF. Referring to FIG. 5, in line 1, consumer NF 400 sends an HTTP PATCH message to NRF 100. The HTTP PATCH message can be an NF heart-beat request message to update nfstatus and load parameters of the NF profile or a partial NF update request to update all or part of the NF profile of consumer NF 400 maintained by NRF 100. NRF 100 receives the HTTP PATCH message, determines that the parameters being updated include at least one parameter that is not in the exception list of parameters and, in response, increments the stored NF profile version number for consumer NF 400. NRF 100 sends a response to the HTTP PATCH request message to consumer NF 400. The response may be a 200 OK message or a 204 No Content message as indicated in line 2a if the NF heart-beat service operation is successful. The NRF may return the 200 OK message including the full NF profile of consumer NF 400 if NRF determines that the NF profile was updated by more than predetermined amount. If the HTTP PATCH operation is not successful, NRF 100 may respond as indicated in line 2b with a 4XX or 5XX message indicating problem details. In this example, it is assumed that NRF 100 sends a 200 OK or a 204 No content message with the "profile version updated" custom header indicating that the NF profile has been updated and the "profile version" custom header containing the updated NF profile version number.

Figure 6:
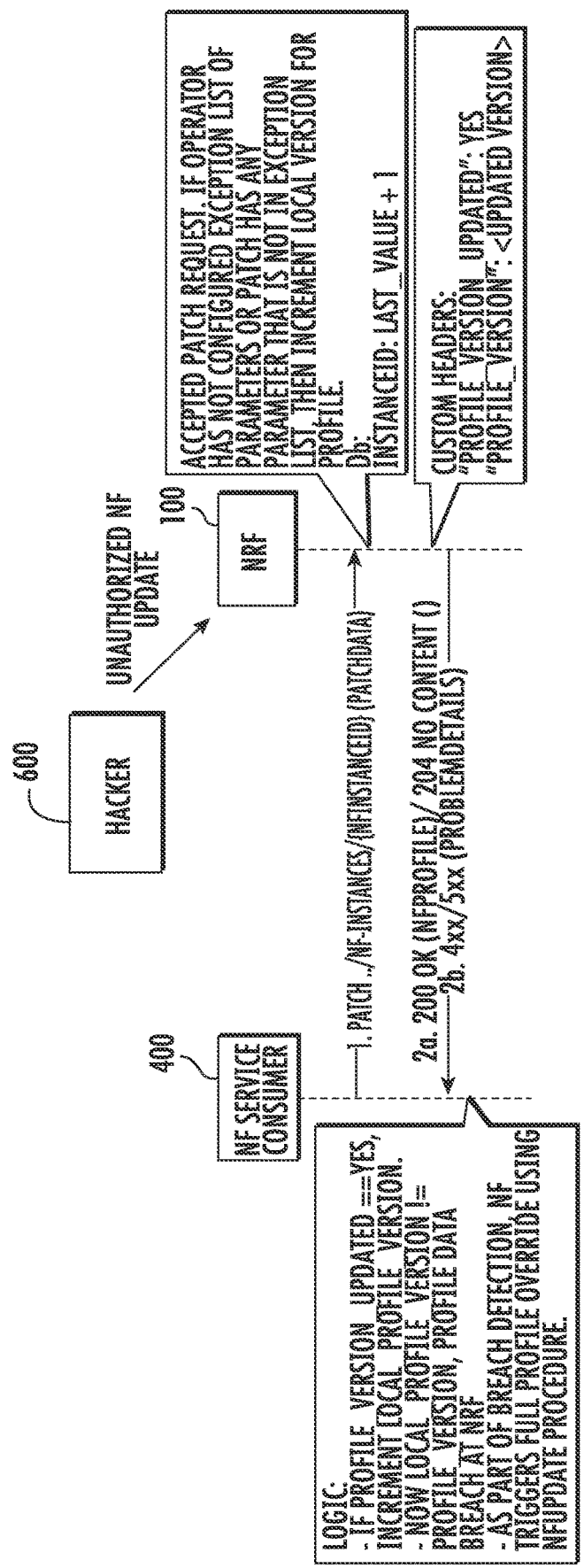
FIG. 6 is a message flow diagram illustrating exemplary messages exchanged in an NF heart-beat or NF update service operation where NF profile versions maintained by the heart-beating NF and the NRF are not aligned.

Consumer NF 400 receives the response message and reads the custom headers. Consumer NF 400 determines that the profile version number has been updated, increments its local stored version of the NF profile version number and compares the incremented local version number with the version number received in the custom header. In this case, it is assumed that the profile version numbers match, and consumer NF 400 stores the incremented profile version number as the current NF profile version number. FIG. 6 is a message flow diagram illustrating exemplary messages exchanged in an NF heart-beat or NF update service operation when NF profile version numbers are not aligned because of an update by a hacker. Referring to FIG. 6, a hacker 600 updates an NF profile of consumer NF 400 with NRF 100 causing NRF 100 to increment the NF profile version number stored for consumer NF 400. In line 1 of the message flow diagram, consumer NF 400 sends an HTTP PATCH request to NRF 100 to update the NF profile of consumer NF 400 with NRF 100. In this example, it is assumed that the HTTP PATCH operation is successful, so NRF 100 responds as indicated in line 2a with a 200 OK message containing the NF profile of consumer NF 400. NRF 100 includes in the response message the profile version updated header and the current profile version number. In this example, the profile version number is out of sync with the profile version number stored by consumer NF 400. Consumer NF 400 receives the HTTP PATCH response message, determines that the message has an NF profile version number and increments its locally stored NF profile version number. Consumer NF 400 compares the local NF profile version number to the NF profile version number in the response message. In this case the incremented local version number does not match the NF profile version number received in the HTTP PATCH response message. Accordingly, consumer NF 400 determines that a breach has occurred in the NF profile maintained by NRF 100 and takes action to remedy the breach. For example, consumer NF 400 may send an alert to the network operator and initiate steps to update the NF profile stored with NRF 100. Consumer NF 400 may store the NF profile version number received from NRF 100 in the NF heart-beat response message so that the NF profile version number maintained by NF service consumer 400 will be synchronized with the NF profile version number maintained by NRF 100 for subsequent NF update and NF heart-beat service operations.

Figure 7:
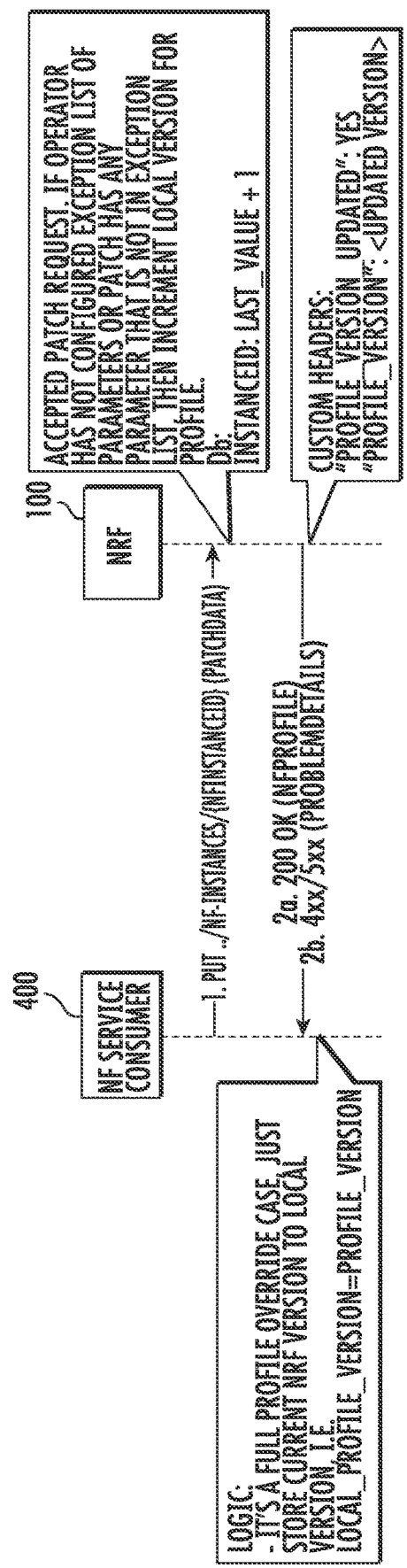
FIG. 7 is a message flow diagram illustrating exemplary messages exchanged in an NF update service operation after an NF detects an NF profile data breach at the NRF.

FIG. 7 is a message flow diagram illustrating exemplary steps performed by NF service consumer 400 to update or override its NF profile in response to detecting a modification. The steps illustrated in FIG. 7 may be performed after a breach is detected, for example, using the steps illustrated in FIG. 6. Referring to FIG. 7, consumer NF 400 sends an NF update request message in line 1 to NRF 100. The NF update request message is an HTTP PUT message that includes the NF profile of consumer NF 400 and requests that NRF 100 replace the current NF profile stored by NRF 100 with the NF profile contained in the NF update request message. NRF 100 receives the NF update request message and replaces the NF profile of consumer NF 400 in its NF profiles database with the NF profile received from consumer NF 400. NRF 100 increments the stored NF profile version number and adds the incremented NF profile version number as a custom header to be sent to consumer NF 400 in a response to the NF update request message. In line 2A, NRF 100 sends the response to consumer NF 400.

Consumer NF 400 receives the response and performs the NF version number check as described above with regard to FIG. 6. Because consumer NF 400 stored the updated version number when the last NF heart-beat response was received, the incremented version number matches the updated version number received from the NRF in the NF update response. Consumer NF 400 stores the incremented NF profile version number as the current NF profile version number. Thus, using the steps illustrated in FIGS. 6 and 7, consumer NF 400 is able to successfully detect and remedy an NF profile update made by a hacker. The solution requires minimal processing by consumer NF 400 and NRF 100 and does not require additional messaging in the network. In addition, because the NF profile version check is performed when a response to an NF update or NF heart-beat response is received, the consumer NF is not required to implement special logic to query the NRF to obtain a current copy of the NF profile of the consumer NF and perform parameter-by-parameter comparisons to determine whether the copy maintained by the NRF matches the NF profile maintained by the consumer NF.

Figure 8:
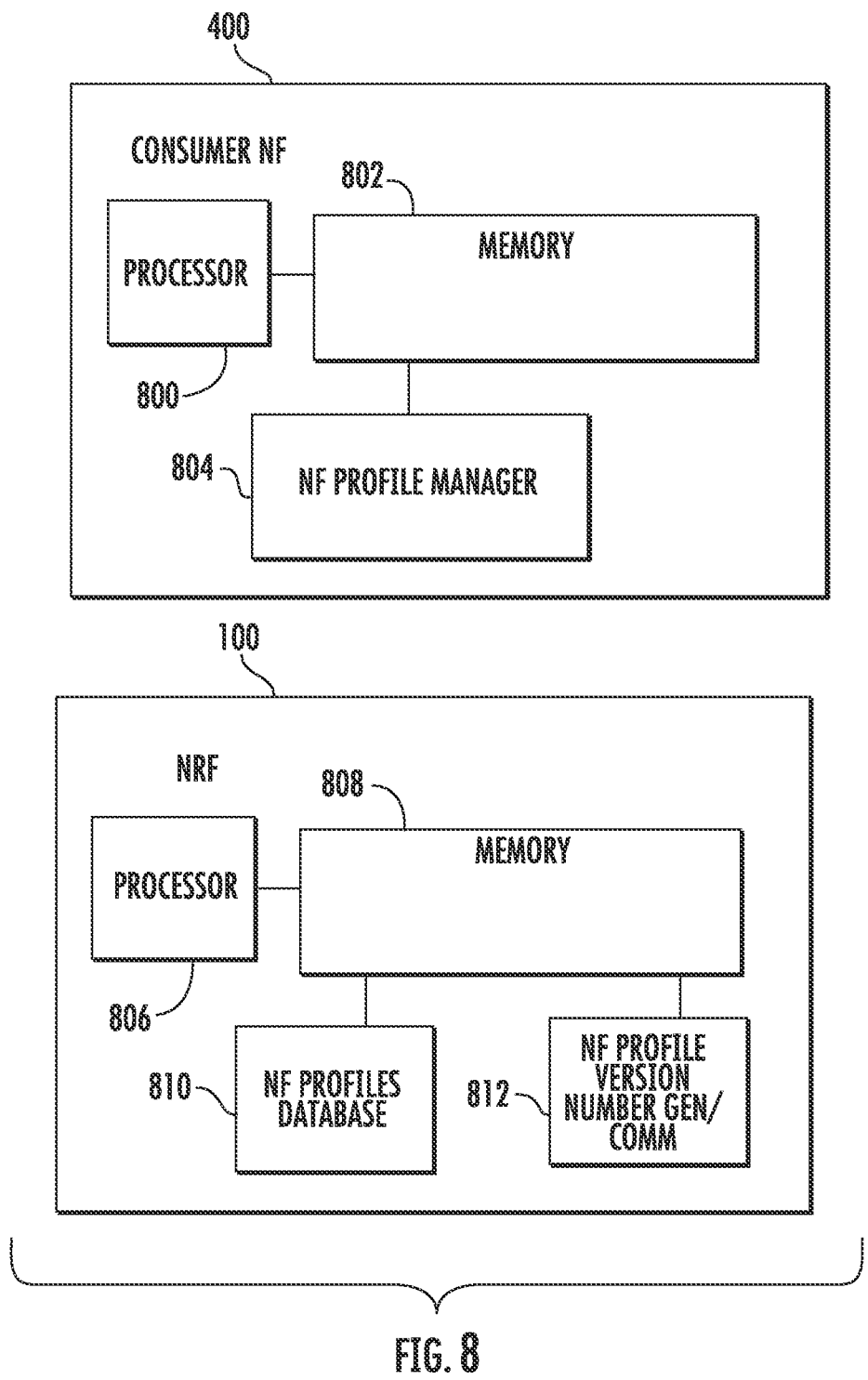
FIG. 8 is a block diagram illustrating an exemplary architecture for handling hacker intrusion in NF profile management at the NRF.

FIG. 8 is a block diagram illustrating and exemplary architecture for consumer NF 400 and NRF 100 in detecting and remedying hacker intrusion in NRF management service operations. Referring to FIG. 8, consumer NF 400 includes at least one processor 800 and memory 802. Consumer NF 400 also includes an NF profile manager 804 for storing a local copy of its NF profile version number based on the NF profile version number received from the NRF in response to an NF register service operation, checking the NF profile version number in responses to NF update and NF heart-beat request messages, and remedying detected breaches of the NF profile maintained by the NRF. For example, NF profile manager 804 may implement the steps illustrated in FIGS. 5-7 to detect and remedy breaches in the NF profile maintained by the NRF. NF profile manager 804 may be implemented using computer executable instructions stored in memory 802 and executed by processor 800.

NRF 100 includes at least one processor 806 and a memory 808. NRF 100 further includes an NF profiles database 810 for storing the NF profiles of registered NFs. NRF 100 further includes and NF profile version number generator/communicator 812 for setting the NF profile version number for an NF service consumer in response to an NF register request, incrementing the NF profile version number in response to NF update and NF heart-beat service requests, and communicating the NF profile version numbers to NF service consumers in response messages. NF profile version number generator/communicator 812 may be implemented using computer executable instructions stored in memory 808 and executed by processor 806.

Figure 9:
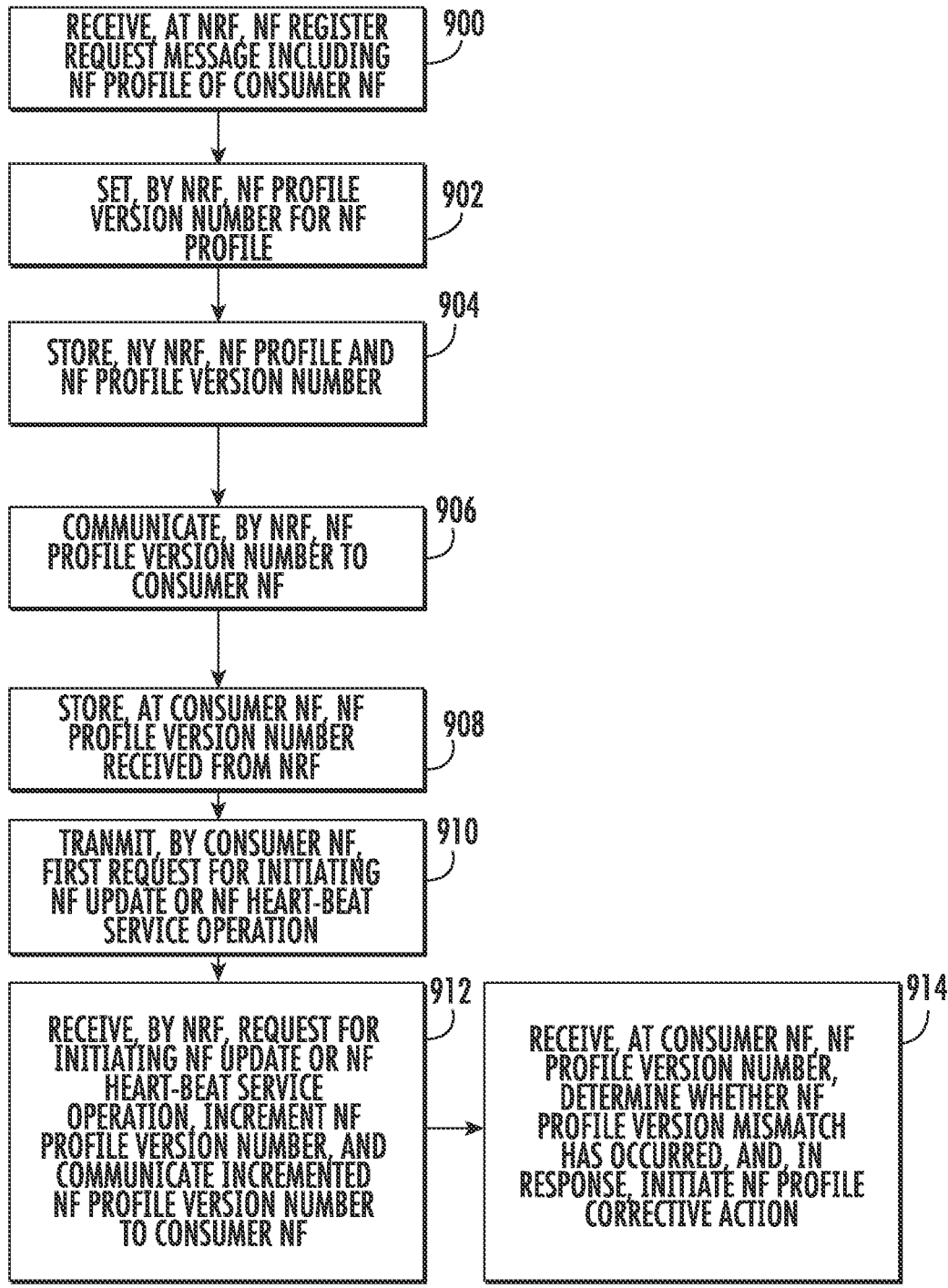
FIG. 9 is a flow chart illustrating an exemplary process for handling hacker intrusion in NF profile management at the NRF.

FIG. 9 is a flow chart illustrating an exemplary process for handling hacker intrusion in NF profile management service operations. Referring to FIG. 9, in step 900, the process includes receiving, at the NRF and from a consumer NF, an NF register request message including an NF profile of the consumer NF. For example, NRF 100 may receive an NF register request from consumer NF 400 to register the NF profile of consumer NF 400 with NRF 100.

In step 902, the process includes setting, by the NRF, an NF profile version number for the NF profile. For example, NRF 100 may algorithmically generate an NF profile version number for the NF profile using any suitable algorithm, such as a random number generation algorithm. Although the term "NF profile version number" is used herein, it is understood that an NF profile version number may include any set of one or more alphanumeric characters that can be used to identify the version of an NF profile maintained by the NRF.

In step 904, the process includes storing, by the NRF, the NF profile and the NF profile version number. For example, NRF 100 may store the NF profile in NF profiles database 810. NRF 100 may store the NF profile version number as part of the NF profile stored in NF profiles database 810 or in a database separate from NF profiles database 810 used to maintain NF profile version numbers.

In step 906, the process includes communicating, by the NRF, the NF profile version number to the consumer NF. For example, NRF 100 may communicate a newly assigned NF profile version number to consumer NF 400 in a custom header that is sent as part of an NF register response message.

In step 908, the process includes, at the consumer NF, storing the NF profile version number received from the NRF. For example, consumer NF 400 may receive the NF register response message, determine that the NF register response message includes an NF profile version number in a custom header, read the value of the NF profile version number from the custom header, and store the NF profile version number received from NRF 100 in memory local to consumer NF 400.

In step 910, the process includes, at the consumer NF, transmitting a first request for initiating an NF update or NF heart-beat service operation to update the NF profile with the NRF. For example, consumer NF 400 may transmit an NF update request or NF heart-beat request for replacing all or a portion of the NF profile of consumer NF 400 maintained by NRF 100.

In step 912, the process includes, at the NRF, receiving the first request for initiating the NF update or NF heart-beat service operation, incrementing the NF profile version number, and communicating the incremented NF profile version number to the consumer NF. For example, NRF 100 may receive an NF update or NF heart-beat request from consumer NF 400, increment the NF profile version number maintained at NRF 100 for consumer NF 400, and transmit the incremented NF profile version number to consumer NF 400 in a custom header of an NF heart-beat or NF update response message. To increment the NF profile version number, NRF 100 may perform any suitable operation that algorithmically changes the NF profile version number in an manner that can be repeated and checked by consumer NF 400.

In step 914, the process includes, at the consumer NF, receiving the incremented NF profile version number, determining whether an NF profile version mismatch has occurred, and, in response to determining that an NF profile version mismatch has occurred, initiating an NF profile corrective action with the NRF. For example, consumer NF 400 may receive the NF update or NF heart-beat response message, determine that the custom header with the NF profile version number is present, and read the value of the NF profile version number in the custom header. Consumer NF 400 may increment the stored NF profile version number and compare the incremented stored NF profile version number to the NF profile version number received in the NF heart-beat or NF update response message. If the incremented stored NF profile version number matches the NF profile version number in the response to the NF heart-beat request or NF update request, consumer NF 400 may determine that a breach of the NF profile has not occurred. If the incremented stored NF profile version number does not match the NF profile version number in the response to the NF heart-beat request or NF update request, consumer NF 400 may determine that a breach of the NF profile has occurred.

In yet another alternative, consumer NF 400 may compare the stored NF profile version number with the NF profile version number received in the response to the NF update or NF heart-beat request by computing a difference between the non-incremented stored NF profile version number and the NF profile version number received in the response to the NF update or NF heart-beat request. If the difference exceeds the amount by which the NF profile version number is incremented by the NRF in response to a single NF update or NF heart-beat request, consumer NF 400 may determine that a breach of the NF profile has occurred. If the difference equals the amount by which the NF profile version number is incremented by the NRF in response to a single NF update or NF heart-beat request, consumer NF 400 may determine that a breach of the NF profile has not occurred.

In either of these cases, if consumer NF 400 determines that a breach has occurred, consumer NF 400 may remedy the breach by updating the NF profile of consumer NF 400 with NRF 100. Consumer NF 400 may implement the update by sending an NF update request with a copy of the NF profile stored locally by consumer NF 400 to NRF 100. NRF 100 may replace the NF profile stored for consumer NF 400 in the NF profiles database with the NF profile received in the NF update request, increment the NF profiles version number, and respond to consumer NF 400 with a 200 OK message along with the incremented NF profile version number.

The disclosure of each of the following references is incorporated herein by reference in its entirety.

REFERENCES 1. 3$^{rd}$ Generation Partnership Project; Technical Specification Group Core Network and Terminals; 5G System; Network Function Repository Services; Stage 3 (Release 17) 3GPP TS 29.510 V17.3.0 (2021-09)
2. 3$^{rd}$ Generation Partnership Project; Technical Specification Group
  Services and System Aspects; Security architecture and procedures for 5G System (5GS) (Release 17) 3GPP TS 33.501 V17.3.0 (2021-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for handling hacker intrusion in network function (NF) profile management at an NF repository function (NRF), the method comprising:
  receiving, at the NRF and from a consumer NF, an NF register request message including an NF profile of the consumer NF;
  setting, by the NRF, an NF profile version number for the NF profile;
  storing, by the NRF, the NF profile and the NF profile version number;
  communicating, by the NRF, the NF profile version number to the consumer NF;
  at the consumer NF, storing the NF profile version number received from the NRF;
  at the consumer NF, transmitting a first request for initiating an NF update or NF heart-beat service operation to update the NF profile with the NRF;
  at the NRF, receiving the first request for initiating the NF update or NF heart-beat service operation, incrementing the NF profile version number, and communicating the incremented NF profile version number to the consumer NF; and
  at the consumer NF, receiving the incremented NF profile version number, determining whether an NF profile version mismatch has occurred, and, in response to determining that an NF profile version mismatch has occurred, determining that the NF profile of the consumer NF has been updated without authorization by a hacker and initiating an NF profile corrective action with the NRF by updating, by the consumer NF and with the NRF, the NF profile stored by the NRF for the consumer NF with an NF profile of the consumer NF stored locally by the consumer NF.

2. The method of claim 1 wherein setting, by the NRF, the NF profile version number includes algorithmically generating the NF profile version number at the NRF.

3. The method of claim 2 wherein algorithmically generating the NF profile version number at the NRF includes using a random number generation algorithm to generate the NF profile version number at the NRF.

4. The method of claim 1 wherein communicating the NF profile version number to the consumer NF includes communicating the NF profile version number in a response to the NF register request message.

5. The method of claim 1 wherein communicating the incremented NF profile version number to the consumer NF includes communicating the incremented NF profile version number to the consumer NF in a response message to the first request for initiating the NF heart-beat or update service operation.

6. The method of claim 5 wherein communicating the incremented NF profile version number to the consumer NF includes communicating the incremented NF profile version number to the consumer NF in a custom header added to the response message, and, further comprising communicating, via the response message, a profile version updated indicator to the consumer NF indicating that the NF profile version number has been changed by the NRF.

7. The method of claim 1 wherein determining whether an NF profile version mismatch has occurred includes, at the consumer NF, comparing the incremented NF profile version number received from the NRF with the stored NF profile version number or an incremented version of the stored NF profile version number.

8. The method of claim 1 wherein determining whether an NF profile version mismatch has occurred includes determining that an NF profile version mismatch has occurred.

9. The method of claim 1 wherein determining whether an NF profile version mismatch has occurred includes determining that an NF profile version mismatch has not occurred, and, in response, at the consumer NF, incrementing the stored NF profile version number.

10. The method of claim 1 comprising, maintaining, at the NRF, a list of exception parameters for which the NF profile version number is not updated, receiving, at the NRF, a second request for initiating an NF update or NF heart-beat service operation, determining that the second request updates only NF profile parameters on the list of exception parameters, and, in response, refraining from incrementing the NF profile version number.

11. A system for handling hacker intrusion in network function (NF) profile management at an NF repository function (NRF), the system comprising:
an NRF including at least one processor;
a consumer NF including at least one processor;
an NF profile version number generator/communicator implemented by the at least one processor of the NRF for receiving, at the NRF and from the consumer NF, an NF register request message including an NF profile of the consumer NF, setting an NF profile version number for the NF profile, storing the NF profile and the NF profile version number, and communicating the NF profile version number to the consumer NF;
an NF profile manager implemented by the at least one processor of the consumer NF for storing the NF profile version number received from the NRF and transmitting a first request for initiating an NF update or NF heart-beat service operation to update the NF profile with the NRF; and
wherein the NF profile version number generator/communicator is configured to receive the first request for initiating the NF update or NF heart-beat service operation, increment the NF profile version number, and communicate the incremented NF profile version number to the consumer NF and the NF profile manager is configured to receive the incremented NF profile version number, determine whether an NF profile version mismatch has occurred, and, in response to determining that an NF profile version mismatch has occurred, determine that the NF profile of the consumer NF has been updated without authorization by a hacker, and initiate an NF profile corrective action with the NRF by updating, by the consumer NF and with the NRF, the NF profile stored by the NRF for the consumer NF with an NF profile of the consumer NF stored locally by the consumer NF.

12. The system of claim 11 wherein the NF profile version number generator/communicator is configured to algorithmically generate the NF profile version number at the NRF.

13. The system of claim 12 wherein the NF profile version number generator/communicator is configured to use a random number generation algorithm to generate the NF profile version number at the NRF.

14. The system of claim 11 wherein the NF profile version number generator/communicator is configured to communicate the NF profile version number to the consumer NF in a response to the NF register request message.

15. The system of claim 11 wherein the NF profile version number generator/communicator is configured to communicate the incremented NF profile version number to the consumer NF in a response message to the first request for initiating the NF update or NF heart-beat service operation.

16. The system of claim 11 wherein the NF profile manager is configured to determine whether an NF profile version mismatch has occurred by comparing the incremented NF profile version number received from the NRF with the stored NF profile version number or an incremented version of the stored NF profile version number.

17. The system of claim 11 wherein the NF profile manager is configured to determine that an NF profile version mismatch has occurred.

18. The system of claim 11 wherein the NF profile manager is configured to determine that an NF profile version mismatch has not occurred, and, in response, at the consumer NF, incrementing the stored NF profile version number.

19. The system of claim 11 wherein the NF profile version number generator/communicator is configured to maintain, at the NRF, a list of exception parameters for which the NF profile version number is not updated, receive, a second request for initiating an NF update or NF heart-beat service operation, determine that the second request updates only NF profile parameters on the list of exception parameters, and, in response, refrain from incrementing the NF profile version number.

20. One or more non-transitory computer readable media having stored thereon executable instructions that when executed by one or more processors of one or more computers control the one or more computers to perform steps comprising:
receiving, at a network function (NF) repository function (NRF) and from a consumer NF, an NF register request message including an NF profile of the consumer NF;
setting, by the NRF, an NF profile version number for the NF profile;
storing, by the NRF, the NF profile and the NF profile version number;
communicating, by the NRF, the NF profile version number to the consumer NF;
at the consumer NF, storing the NF profile version number received from the NRF;
at the consumer NF, transmitting a first request for initiating an NF update or NF heart-beat service operation to update the NF profile with the NRF;
at the NRF, receiving the first request for initiating the NF update or NF heart-beat service operation, incrementing the NF profile version number, and communicating the incremented NF profile version number to the consumer NF; and
at the consumer NF, receiving the incremented NF profile version number, determining whether an NF profile version mismatch has occurred, and, in response to determining that an NF profile version mismatch has occurred, determining that the NF profile of the consumer NF has been updated without authorization by a hacker and initiating an NF profile corrective action with the NRF by updating, by the consumer NF and with the NRF, the NF profile stored by the NRF for the consumer NF with an NF profile of the consumer NF stored locally by the consumer NF.

\* \* \* \* \*